United States Patent [19]
Tsai

[11] Patent Number: 6,131,508
[45] Date of Patent: Oct. 17, 2000

[54] GARLIC SURFACE MEMBRANE STRIPPER

[76] Inventor: Chuan Yu Tsai, No. 215, Chung Ming Rd., Pao Chung Hsiang, Yun Lin Hsien, Taiwan

[21] Appl. No.: 09/531,508

[22] Filed: Mar. 21, 2000

[51] Int. Cl.⁷ .............................. A23N 7/00; A23N 15/08; A47J 19/06; B30B 9/02
[52] U.S. Cl. ................................ 99/540; 99/495; 99/584; 99/588; 99/623
[58] Field of Search .............................. 99/495, 506, 508, 99/537–541, 546, 584–589, 591, 593–595, 623–626; 100/112, 125, 234, 99, 116; 241/167, 169.1, 273.3, 169.2; D7/665, 666; 426/481–483

[56] References Cited

U.S. PATENT DOCUMENTS

| | | | |
|---|---|---|---|
| D. 372,642 | 8/1996 | Baines ......................................... D7/665 |
| 4,348,950 | 9/1982 | Harris .......................................... 99/510 |
| 4,537,123 | 8/1985 | Holcomb ................................ 99/510 X |
| 4,714,205 | 12/1987 | Steinko ...................................... 241/95 |
| 5,101,720 | 4/1992 | Bianchi ................................ 100/112 X |
| 5,158,011 | 10/1992 | Chen ........................................... 99/584 |
| 5,165,335 | 11/1992 | Bianchi .................................. 99/495 X |
| 5,303,640 | 4/1994 | Gaber et al. ............................... 99/495 |
| 5,370,044 | 12/1994 | Lackie .................................. 100/125 X |
| 5,465,657 | 11/1995 | Wu ............................................. 99/584 |
| 5,490,454 | 2/1996 | Ancona et al. ............................ 99/510 |
| 5,529,252 | 6/1996 | Baines ....................................... 241/95 |
| 5,562,256 | 10/1996 | Wolman et al. ...................... 241/169.1 |

*Primary Examiner*—Timothy Simone
*Attorney, Agent, or Firm*—Rosenberg, Klein & Lee

[57] ABSTRACT

A garlic surface membrane stripper comprises a first body, a second body, a press rod, and a press structure. The first body is installed with a plurality of membrane stripping claws therewithin. The lower ends of the membrane stripping claws are formed with respective free ends, and each of the membrane stripping claw is installed with a protrusion. The membrane stripping claws encircles around a space as a chamber. The second body is installed with an assembling hole and an inlet, and the second body is connected to an upper end of the first body. The press rod is slidably matched to an assembling hole of the second body. The press structure is installed with a plurality of press pieces, and the press structure is connected to a lower end of the press rod. By aforesaid structure, a garlic surface membrane stripper is formed.

9 Claims, 7 Drawing Sheets

GARLIC SURFACE MEMBRANE STRIPPER

FIELD OF THE INVENTION

The present invention relates to a garlic surface membrane stripper for striping the surface membrane of a garlic rapidly and easily.

BACKGROUND OF THE INVENTION

Garlic is a general vegetable in baking. Since the surface of a garlic has a membrane which is necessary to be stripped before being used. However, it is troublesome and time-wasted to stripe the membrane by fingers, or in general, the user uses knife to flap the garlic and then stripes the membrane from the garlic. All these operations are inconvenient, especially to stores or homes which have a large consumption to garlic.

Therefore, it is apparent that there is an eager demand for a garlic surface membrane stripper for striping the surface membrane of a garlic rapidly and easily.

SUMMARY OF THE INVENTION

Accordingly, the primary object of the present invention is to provide a garlic surface membrane stripper for stripping the surface membrane of a garlic with an convenient, rapid and easy operation. Thereby, the user is unnecessary to stripe the membrane of a garlic by fingers. Moreover, the present invention has a simple structure and can be assembled easily so that the cost is reduced greatly.

In order to achieve the aforesaid object, the present invention provide a garlic surface membrane stripper comprises a first body, a second body, a press rod, and a press structure. The first body is installed with a plurality of membrane stripping claws therewithin. The lower ends of the membrane stripping claws are formed with respective free ends, and each of the membrane stripping claw is installed with a protrusion. The membrane stripping claws encircle around a space as a chamber. The second body is installed with an assembling hole and an inlet, and the second body is connected to an upper end of the first body. The press rod is slidably matched to an assembling hole of the second body. The press structure is installed with a plurality of press pieces, and the press structure is connected to a lower end of the press rod. By aforesaid structure, a garlic surface membrane stripper is formed.

The various objects and advantages of the present invention will be more readily understood from the following detailed description when read in conjunction with the appended drawing.

DETAILED DESCRIPTION OF THE PREFERRED EMBODIMENTS

Figure 1:
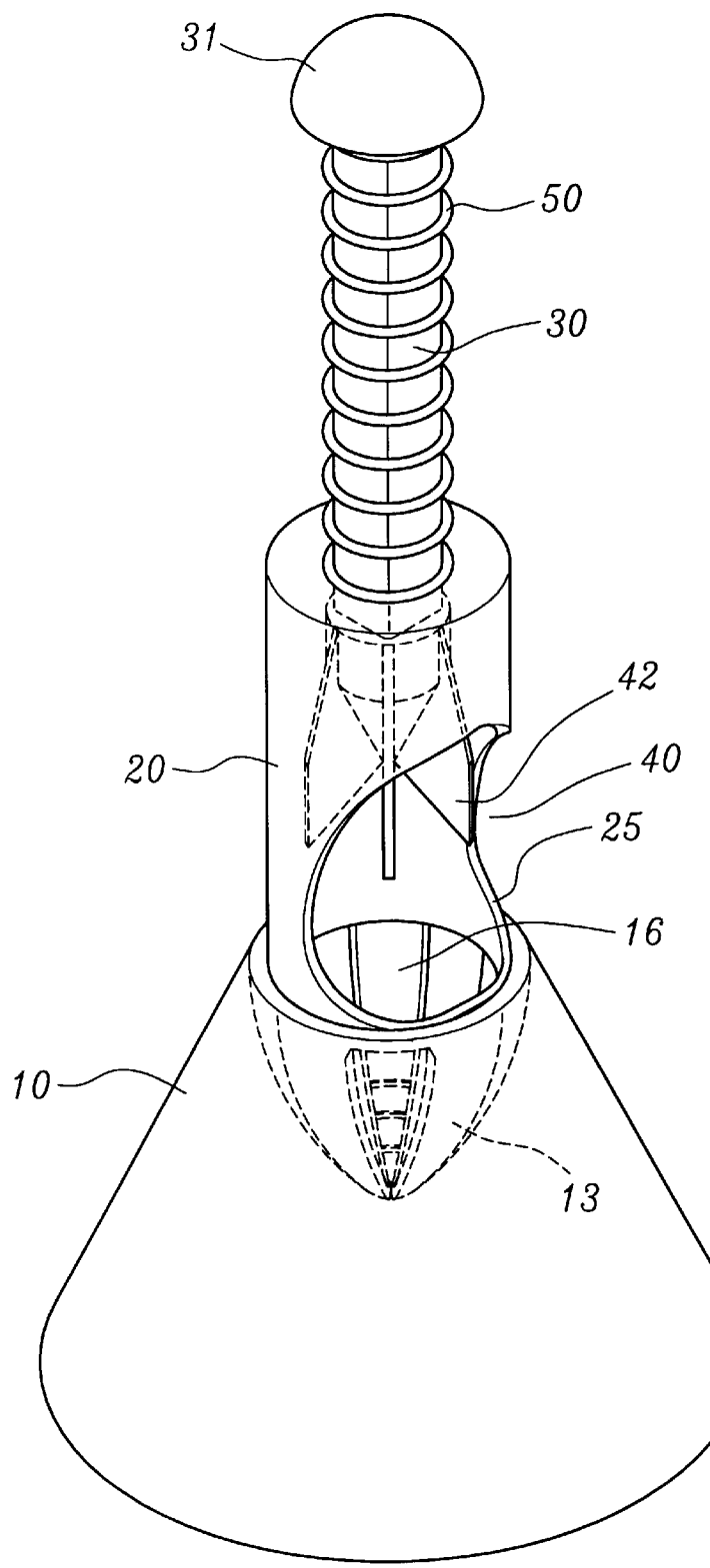
FIG. 1 is an assembled perspective view of the present invention.
Figure 2:
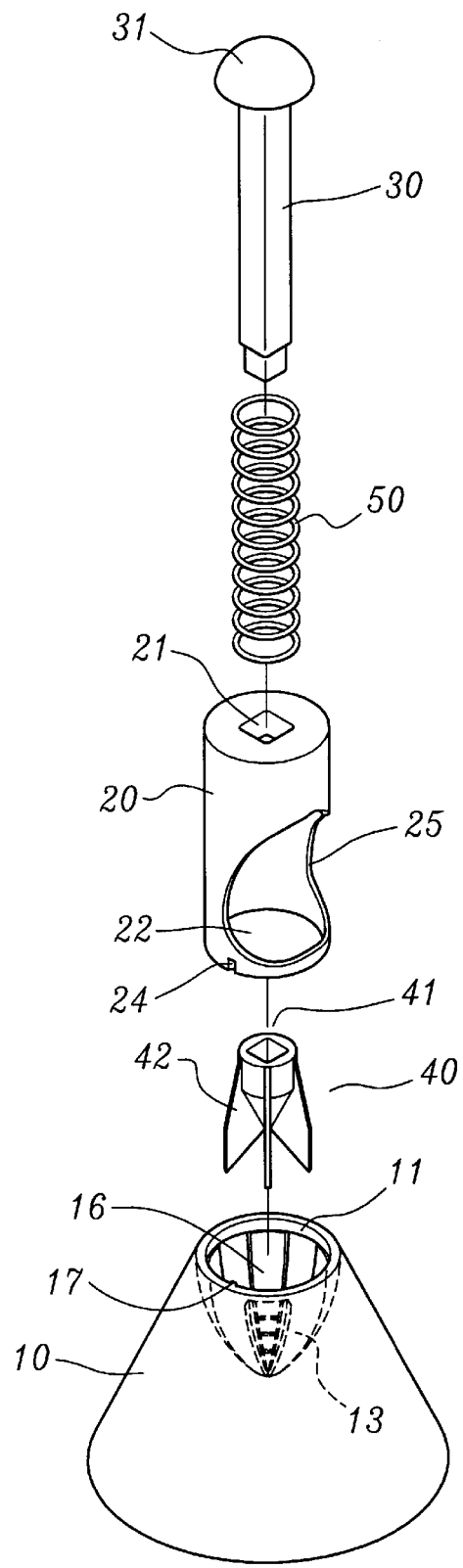
FIG. 2 is an exploded perspective view of the present invention.
Figure 3:
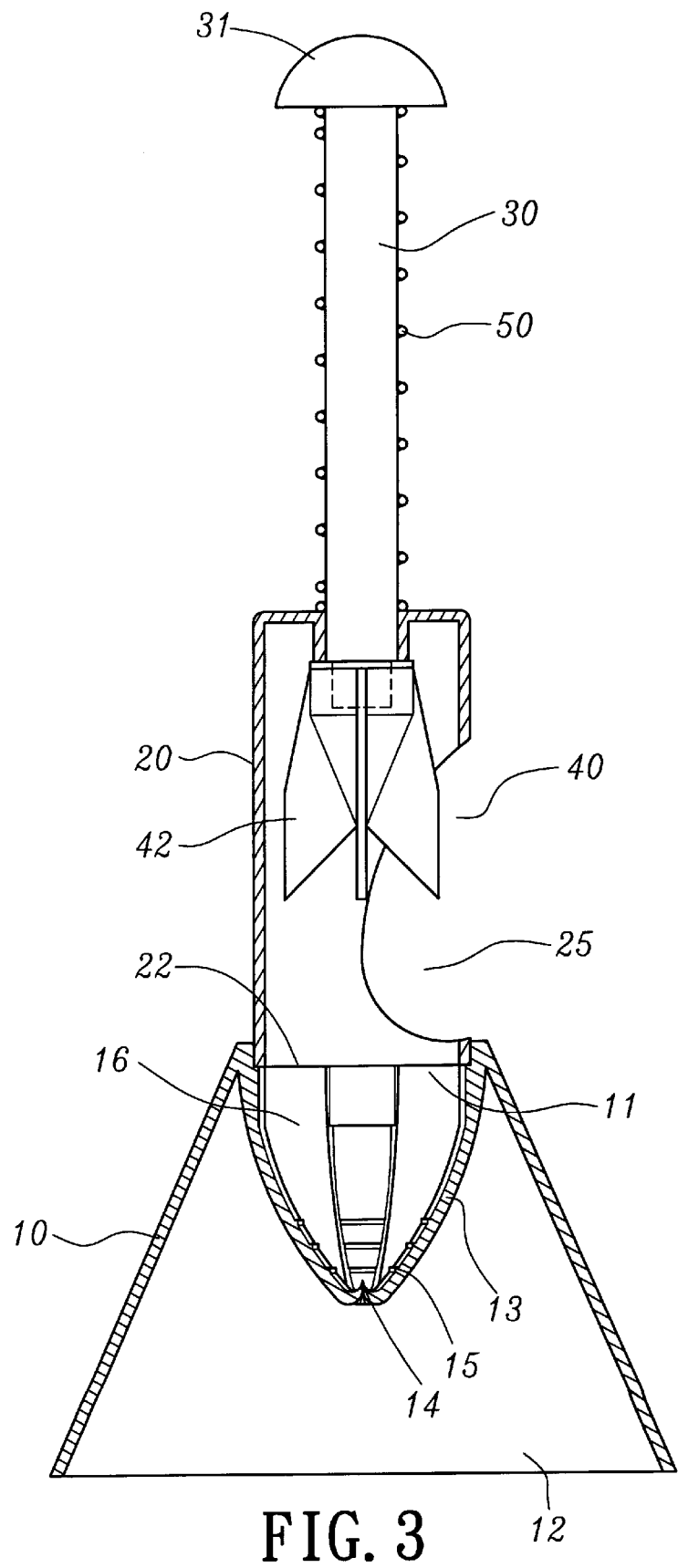
FIG. 3 is a cross sectional view of the present invention.
Figure 4:
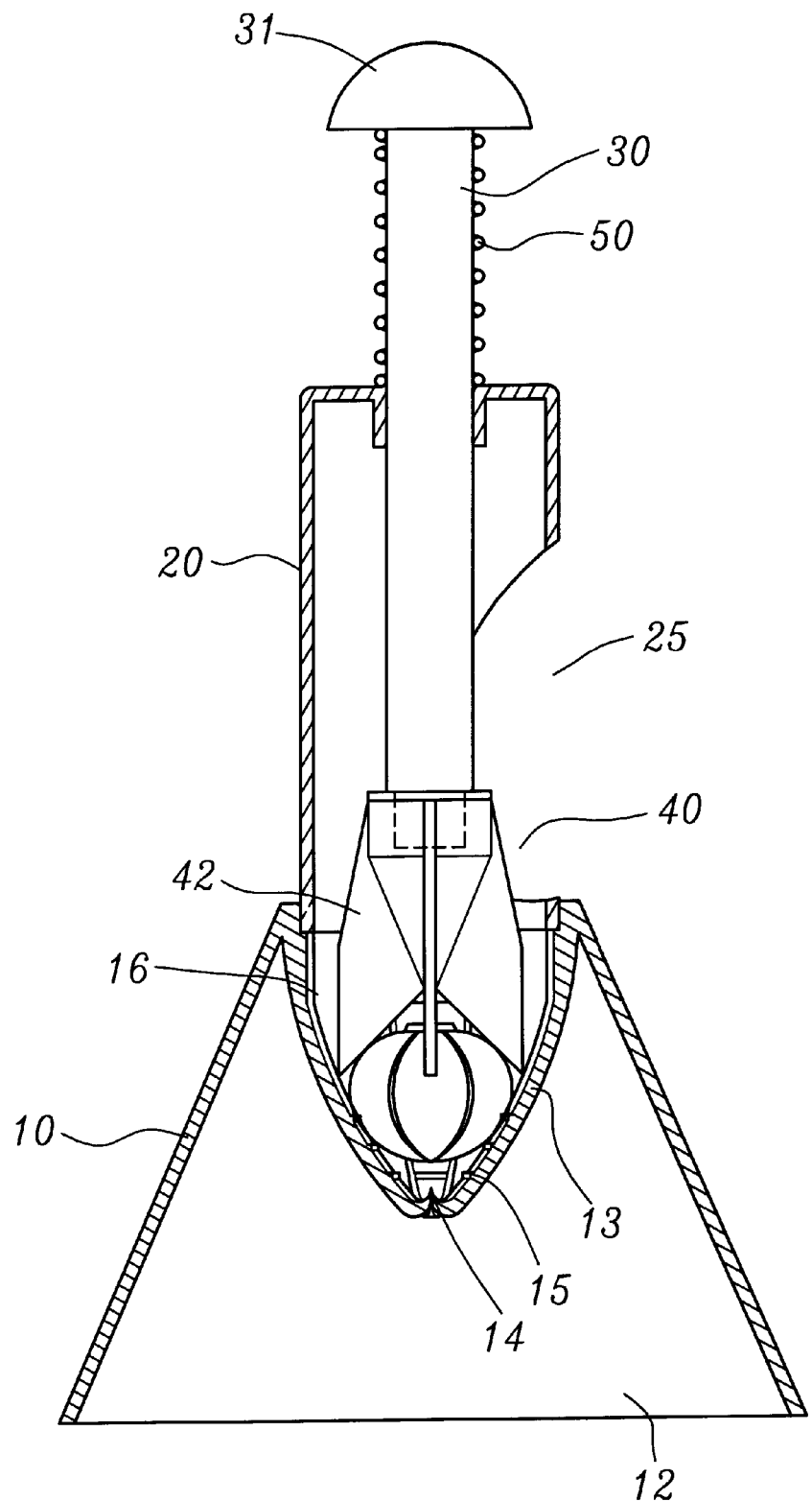
FIG. 4 is a first schematic view showing the use the present invention.

With reference to FIGS. 1, 2 and 3, the assembled perspective view, exploded perspective view, and cross sectional view according to the present invention are illustrated. The present invention provides a garlic surface membrane stripper. The garlic surface membrane stripper of the present invention includes a first body 10, a second body 20, a press rod 30, a press structure 40 and an elastic element 50. The first body 10 is a hollow truncated cone, and the lower end and upper end thereof are formed with openings 11 and 12, respectively. A plurality of membrane stripping claws 13 are integrally formed within the first body 10. The membrane stripping claws 13 extends downwards from the opening 11. Each membrane stripping claw 13 is a cambered piece bending toward the center of the opening. The lower end of each membrane stripping claw 13 is formed as a free end and the membrane stripping claws are adjacent with each other. The lower end of the membrane stripping claw 13 is bent upwards slightly to be formed with a projecting end 14. The inner wall of each membrane stripping claw 13 is protruded with a plurality of protrusions 15 for catching the membrane of garlic. The inner parts of the membrane stripping claws 13 are formed as a chamber 16 for containing a garlic. A key 17 protrudes from the inner wall of the opening 11 at the upper end of the first body 10.

The second body 20 is a hollow cylinder, and the upper end and lower end thereof are formed with an assembling hole 20 and an opening 22, respectively. The assembling hole 21 is a rectangular hole. The outer wall of the opening 22 is installed with a key groove 24. The side wall of the second body 20 is further installed with an inlet 25 for throwing a garlic. The lower end of the second body 20 is embedded into the opening 11 at the opening of the first body 10 so that the second body 20 is connected to the upper end of the second body 10. The interior of the first body 10 is communicated with the interior of the second body 20. The key 17 at the inner wall of the opening 11 at the upper end of the first body 10 is matched with the key groove 24 at the outer wall of the opening at the lower end of the second body 20 for preventing that a relative rotation is generated between the first body 10 and the second body 20.

The press rod 30 is a rectangular rod with a proper length, and one end thereof is integrally formed and connected to a terminal 31 with round surface. The press rod 30 is slidably matched in the assembling hole 21 of the second body 20 so that the press rod 20 is movable longitudinally.

The press structure 40 has a connecting portion 41. The lower end of the connecting portion 41 is integrally formed with a plurality of press pieces 42 which are spaced with an equal angle. The lower end of the press piece 42 is tilt toward the center of the press structure 40 from the lower end to the upper end thereof. The press structure 40 is connected to the lower end of the press rod 30 by the connecting portion 41.

The elastic element 51 is a compressing spring and encloses the press rod 30. The elastic element 50 is located between the terminal 31 at the upper end of the press rod 30 and the upper end of the second body 20 for pushing the press rod 30 and the press structure 40 to restore upwards to the original state. Thereby, a garlic surface membrane stripper is formed by aforesaid components.

Figure 5:
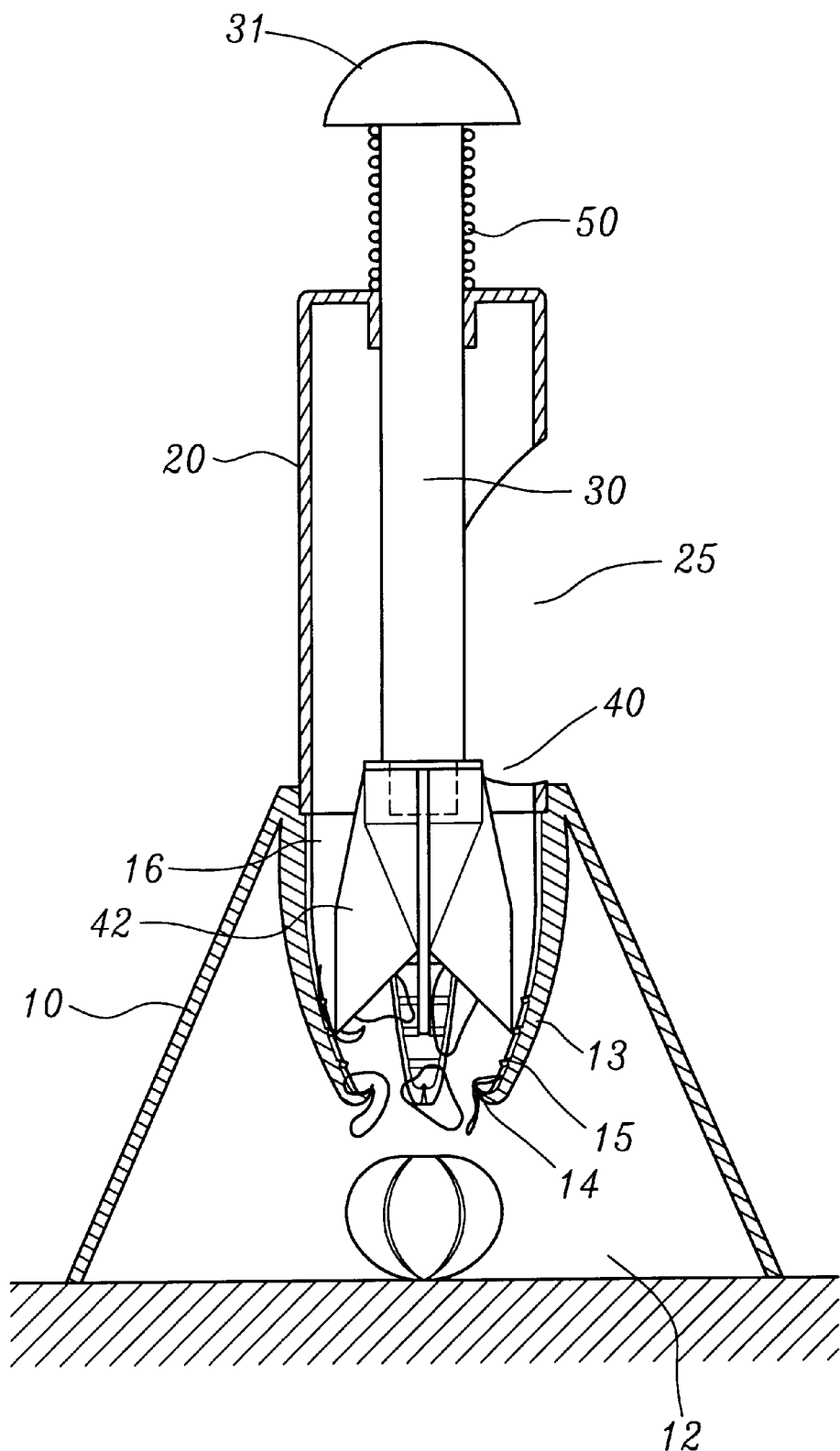
FIG. 5 is a second schematic view showing the use the present invention.
Figure 6:
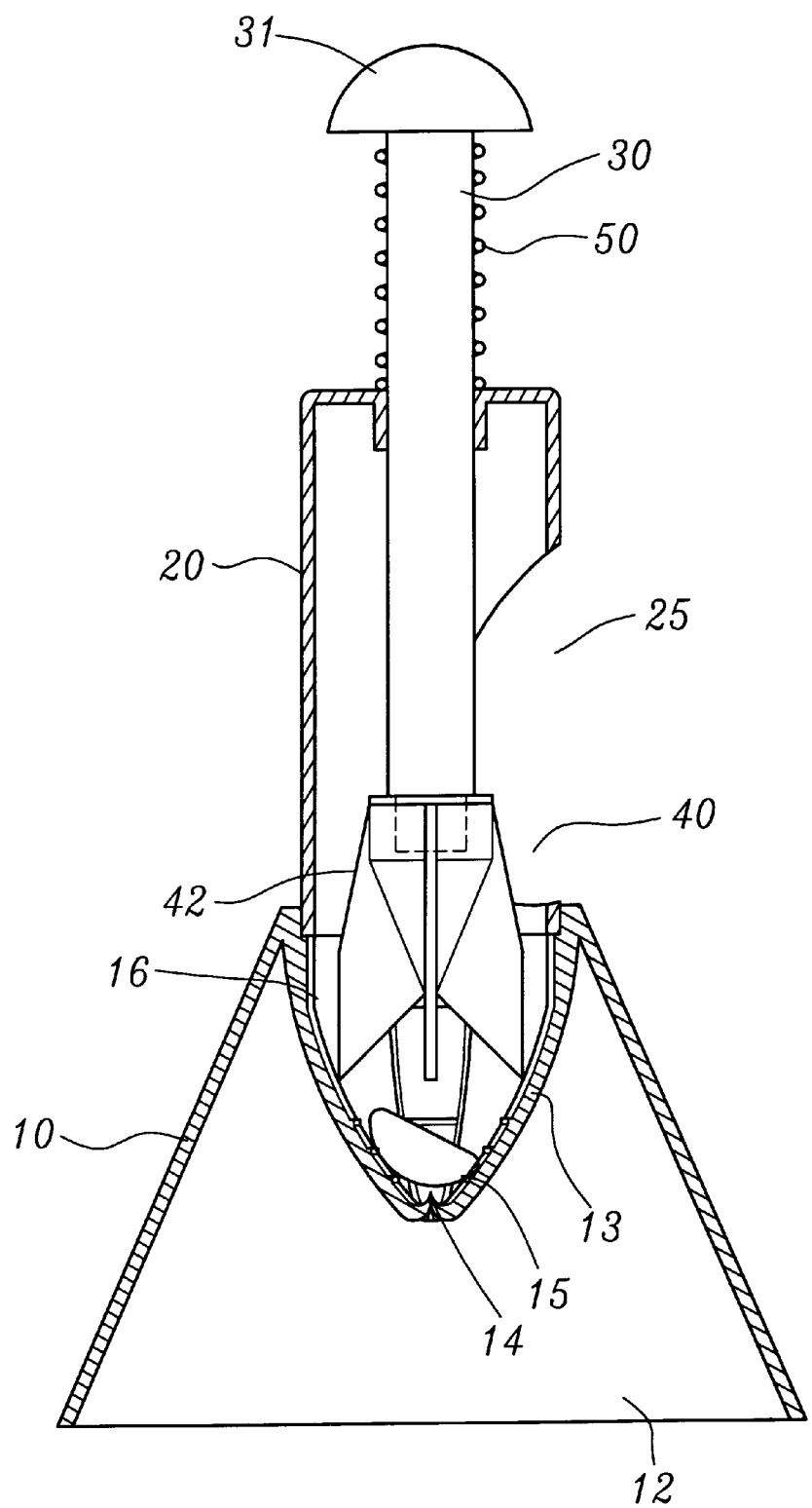
FIG. 6 is a third schematic view showing the use the present invention.
Figure 7:
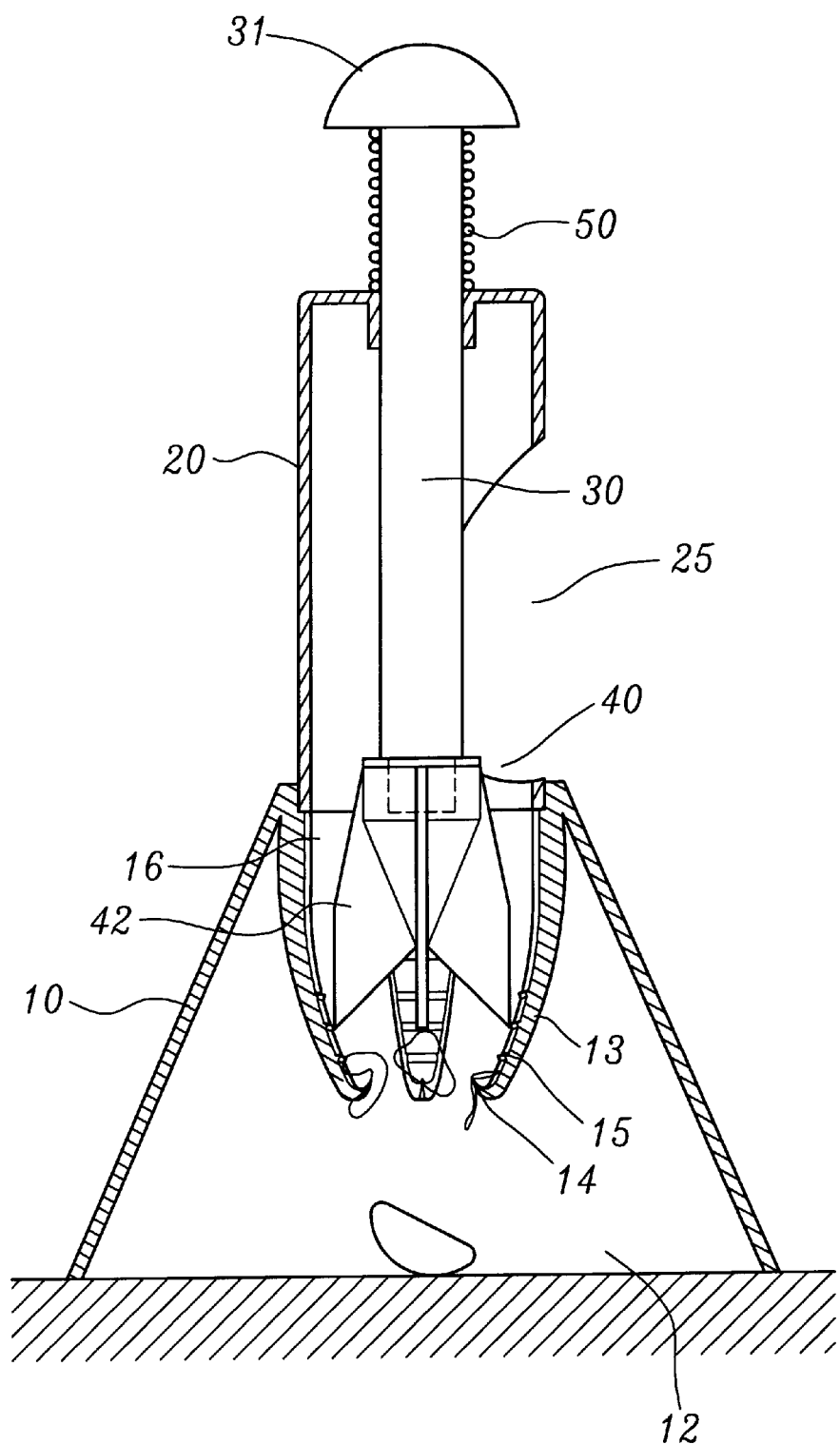
FIG. 7 is a fourth schematic view showing the use the present invention.

Referring to FIGS. 4–7, a schematic view showing the use of the present invention is illustrated. In using the present invention, a whole garlic can be thrown into the inlet 25 of the second body 20 to cause the garlic falls into the chamber 16 of the first body 10 so as to press the terminal 31 of the press rod 30 and thus, the press rod 30 drives the press structure 40 to move downwards. Then, the press piece 42 of the press structure 40 will press the garlic to move downwards along the inner wall of the membrane stripping claws 13 (air absorbing button 4). As the garlic contact with the inner wall of the membrane stripping claw 13, the membrane on the surface of the garlic can be caught by the protrusion 15 on the membrane stripping claws 13, and therefore, the garlic is pressed to pass through the lower end of the membrane stripping claws 13, the membrane will be stripped (as shown in FIG. 5) instead of passing through the lower end of the membrane stripping claws 13. Consequently, the object of stripping the surface membrane of the garlic is achieved and next, the membrane falls into the bottom of the first body 10. The press rod 30 and the press structure 40 can be restored upwards to the original places by the elastic element 50. If the membrane on each lobes of the garlic are desired to be stripped. The aforesaid steps can be performed repeatedly (as shown in FIGS. 6 and 7) so that the membrane of each garlic is removed completely.

In the garlic surface membrane stripper of the present invention, it is only necessary to press the press rod 30 downwards, then the press structure 40 can be driven to move downwards to stripe the membrane of a garlic with the membrane stripping claw 13. The operation of the present invention is very conveniently and it can be assembled easily so that the manufacturing cost is reduced greatly. The present invention is especially suitable for the stores or homes necessary a large amount of garlic.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A garlic surface membrane stripper comprising:
   a first body, installed with a plurality of membrane stripping claws therewithin, lower ends of the membrane stripping claws being formed with respective free ends, and each of the membrane stripping claw being installed with a protrusion;
   a second body installed with an assembling hole and an inlet, and the second body being connected to an upper end of the first body;
   a press rod slidably matched to an assembling hole of the second body; and
   a press structure installed with a plurality of press pieces, and the press structure being connected to a lower end of the press rod.

2. The garlic surface membrane stripper as claimed in claim 1, wherein the lower end of the first body is formed with an opening.

3. The garlic surface membrane stripper as claimed in claim 1, wherein an upper end of the first body is formed with an opening; an inner wall of the opening is installed with a key; the lower end of the second body is installed with an opening, and an outer wall of this opening is installed with a key groove; a lower end of the second body is connected to the opening at the upper end of the first body so that the interior of the first body is communicated to the interior of the second body, the key at the inner wall at the upper end of the first body is matched with the key groove at the outer wall of the lower end of the first body.

4. The garlic surface membrane stripper as claimed in claim 1, wherein each membrane stripping claws extends downwards from an edge of an upper end of the first body and is formed as a cambered piece.

5. The garlic surface membrane stripper as claimed in claim 1, wherein a lower end of the membrane stripping claw is bent upwards slightly so as to be formed with a protrusion.

6. The garlic surface membrane stripper as claimed in claim 1, wherein the assembling hole of the second body is a rectangular hole and a press rod is a rectangular rod.

7. The garlic surface membrane stripper as claimed in claim 1, wherein an upper end of the press rod is connected with a terminal.

8. The garlic surface membrane stripper as claimed in claim 1, wherein the press pieces are spaced with an equal space, each press piece is inclined toward a center of the press structure from the lower end thereof to the upper end thereof.

9. The garlic surface membrane stripper as claimed in claim 1, wherein an elastic element is installed between the press rod and the second body for pushing the press rod and the press structure upwards to the original position.

* * * * *